United States Patent [19]
Takaki et al.

[11] Patent Number: 5,822,613
[45] Date of Patent: Oct. 13, 1998

[54] DIGITAL SIGNAL PROCESSING UNIT HAVING THREE BUSES FOR SIMULTANEOUSLY TRANSMITTING DATA ON EACH BUS

[75] Inventors: Minoru Takaki, Yokohama; Yoshinori Matsushita, Tokorozawa, both of Japan

[73] Assignee: Texas Instruments Incorporated, Dallas, Tex.

[21] Appl. No.: 547,267

[22] Filed: Oct. 24, 1995

[30] Foreign Application Priority Data

Oct. 24, 1994 [JP] Japan .................................. 6-284425

[51] Int. Cl.[6] .................................................. G06F 13/00
[52] U.S. Cl. .......................................... 395/827; 395/840
[58] Field of Search .................................... 395/821, 827, 395/840, 841, 842, 846, 847, 824

[56] References Cited

U.S. PATENT DOCUMENTS

| | | | |
|---|---|---|---|
| 4,038,642 | 7/1977 | Bouknecht et al. | 395/840 |
| 5,136,701 | 8/1992 | Kawai et al. | 395/847 |
| 5,313,587 | 5/1994 | Patel et al. | 395/840 |
| 5,504,916 | 4/1996 | Murakami et al. | 395/800 |
| 5,566,306 | 10/1996 | Ishida | 395/309 |

*Primary Examiner*—Parshotam S. Lall
*Assistant Examiner*—Viet Vu
*Attorney, Agent, or Firm*—Richard L. Donaldson; William B. Kempler

[57] ABSTRACT

A digital processor enables data to be read from an external memory without losing arithmetic processing efficiency. A coefficient memory 16, a general-use memory 20, an arithmetic logic unit 26, a sum of products computer 28, a program memory 32, and a host interface circuit 34 are coupled to a data bus 10. A data memory 18, the general-use memory 20, an external memory input/output interface circuit 22, an audio/interface circuit 24, the arithmetic logic unit (ALU) 26, and the sum of products computer 28 are coupled to another data bus 12. The general-use memory 20, the external memory input/output interface circuit 22, and the arithmetic logic unit 26 are coupled to a general data bus 14.

4 Claims, 5 Drawing Sheets

FIG. 1
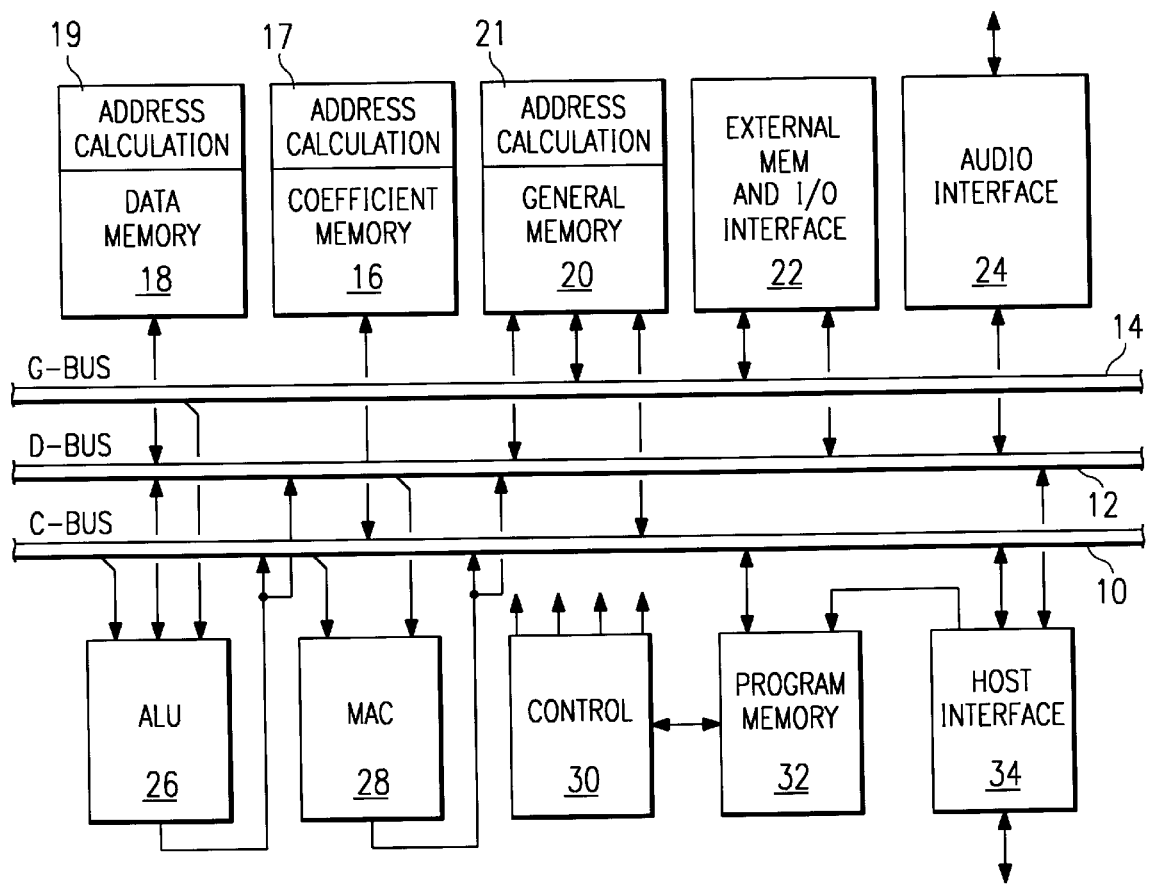
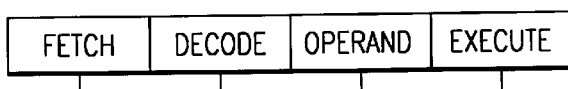
FIG. 3
1. INSTRUCTION IS INPUT FROM M-MEM
2. "MAC" INSTRUCTION IS DECODED
3. ADDRESS INFORMATION IS FED TO D-MEM AND C-MEM. DATA IS INPUT RESPECTIVELY FROM D-MEM AND C-MEM (C BUS AND D BUS ARE USED)
4. MULTIPLICATION AND ADDITION ARE EXECUTED AND THE COMPUTED RESULT IS STORED IN MO REGISTER

DIGITAL SIGNAL PROCESSING UNIT HAVING THREE BUSES FOR SIMULTANEOUSLY TRANSMITTING DATA ON EACH BUS

FIELD OF THE INVENTION

This invention relates to a digital signal processor for a pipeline system.

BACKGROUND OF THE INVENTION

Conventionally, a DSP (digital signal processor) is used in digital signal processing to compute many sums of products, such as in digital filters, digital automation, fast Fourier transforms (FFT), etc. Generally, a DSP is realized as a microprogram or PLA (program logic array) control type microprocessor which can execute pipeline processing with a built-in data memory, program memory, adder, high-speed multiplier, etc., to realize high-speed sum of products arithmetic processing. Also, such a DSP is provided with an input/output function and when there is a large amount of data to be stored, data is stored in an external auxiliary memory via an input/output interface.

To make a DSP that can access the external memory immediately, generally a system structure like that shown in FIG. 8 is used. In this DSP system, an arithmetic control unit 102 within DSP 100 directly provides address information to an external memory 104, write data from arithmetic control unit 102 is transmitted to external memory 104 via data bus 106 and input/output unit 108 during writing, and read data from external memory 104 is transmitted to arithmetic control unit 102 via input/output unit 108 and data bus 106 during reading.

However, in this conventional system, each part within arithmetic control unit 102 cannot advance to the next step until the data transfer is completed, so the pipeline process must enter a standby state until the data transfer is completed. In actuality, the time necessary for arithmetic control unit 102 to access external memory 104 is usually longer than that needed to access internal memory 110.

For example, in audio/digital signal processing, such as sound reproduction, sound compensation, etc., audio data from a CD (compact disc) has data length of 16 bits. When this type of audio data is input/output between external memory 104 as is in data length of 16 bits, an increase in the number of input/output pins, increase in the number of external memory devices, etc., are generated and the hardware cost becomes very high. This becomes noticeable particularly when handling a large amount of delay data, such as processing of reflected sound, etc. Therefore, the overall hardware cost is decreased by making the input/output frequency high and minimizing the input/output bit count between external memory 104. However, accessing external memory 104 becomes slow, the time the pipeline is held becomes longer by that much, and the problem of the processing efficiency of the DSP decreasing is created.

FIG. 9 shows the structure of a DSP system used conventionally as a system for solving the problem. In this system, external memory controller 112, which can write and read data with respect to external memory 104, is provided within DSP 100'. This external memory controller 112 has address register 112a for temporarily holding the address information and data register 112b for temporarily holding the data.

When arithmetic control unit 102 writes data in external memory 104, arithmetic control unit 102 simply has to transfer the address information and data to external memory controller 112 via data bus 106 and, in this way, each part of arithmetic control unit 102 can move to the next step. On the other hand, external memory controller 112 holds the address information and data from arithmetic control unit 124 in address register 112a and data register 112b respectively and writes the pertinent data in the memory address specified by the pertinent address information by accessing external memory 112. This writing is executed in the cycle stipulated beforehand.

When arithmetic control unit 102 reads the data from external memory 104, the arithmetic control unit 102 transfers the address information to external memory controller 112 via data bus 106. Even when external memory controller 112 is reading the data from external memory 104, cycle stipulated beforehand is used. In external memory controller 112, when address information is loaded from arithmetic control unit 102 in address register 112a, data read from external memory 104 in the previous memory cycle is stored in data register 112b. Therefore, arithmetic control unit 102 can receive the previous data from external memory controller 112 at the same time the present address information is being transmitted to external memory controller 112, and each part of arithmetic control unit 102 can move immediately to the next step.

As noted above, external memory controller 112 writes and reads data with respect to external memory 104 so arithmetic control unit 102 simply needs to transfer address and information data between external memory controller 112 via data bus 106 so that the pipeline process does not have to be put on hold.

The DSP system in FIG. 9 secures high-speed arithmetic processing as long as the overall pipeline process does not have to be put on hold when accessing external memory 104. However, while arithmetic control unit 102 accesses external memory controller 112, data bus 106 is used, so it is not possible to execute arithmetic processing within arithmetic control unit 102. Namely, by accessing external memory 104 once, arithmetic processing in arithmetic control unit 102 is decreased once. In the audio/digital signal processing, such as sound field reproduction, etc., the performance of DSP is determined by how much sum of products arithmetic can be executed within a fixed time stipulated by the sampling frequency of the audio signals. In the conventional system, the arithmetic processing frequency in arithmetic control unit 102 is decreased according to the execution of instructions for reading data from external memory 104, so there was a problem of not being able to achieve sufficient performance in the DSP.

The invention provides a digital signal processor which improves the processing capacity by securing high-speed pipeline processing by enabling data to be read from the external memory without losing arithmetic processing efficiency, increasing the arithmetic processing frequency per unit time.

SUMMARY OF THE INVENTION

In a first embodiment, a digital signal processor for processing digital signals by executing a series of instructions in a pipeline system has first, second, and third buses capable of simultaneously transferring different data, a first internal memory coupled to the first bus, a second internal memory coupled to the second bus, an arithmetic circuit coupled to the first and second buses, a third internal memory coupled to the third bus and coupled to at least one of the first and second buses, and an input/output interface coupled to the third bus and coupled to at least one of the first and second buses which writes and reads data to an external memory. During a single instruction cycle a first instruction transferred via the first and second buses and a second instruction transferred via the third bus are simultaneously executed.

In a second embodiment, a second digital signal processor is constructed so that data is read from the first and second internal memories, the read data is transferred to the arithmetic means via the first and second buses, then the data is arithmetically processed the arithmetic means in accordance with the instructions, and such that the prescribed address information is transferred to the input/output interface via the third bus and the data read by the input/output interface from the external memory beforehand is transferred to the third internal memory via the third bus in accordance with the second instruction in the prescribed one instruction cycle.

In a third embodiment, a digital signal processor has a first memory area for storing the address information for accessing the external memory and a second memory area for storing the data transferred from the external memory are set in the third internal memory, and each corresponding piece of address information and data respectively has a fixed offset between the memory address in the first memory area and the memory address in the second memory area where they are stored.

The fourth digital signal processor of the invention, which processes digital signals by executing a series of instructions in the pipeline system has it is equipped with first, second, and third buses capable of simultaneously transferring different data, first and second data storage means connected to the first and second buses, at least one of which is a dual port type, and also connected to the third bus, an arithmetic means connected to the first and second buses, and an input/output interface connected to the third bus and connected to at least one of the first and second buses which can write and read data in an external data storage means, and is realized such that a first instruction using the first and second buses and a second instruction using the third bus are simultaneously executed during one prescribed instruction cycle.

In the digital signal processor of the invention, a third bus for data transfer connected to the input/output interface is provided in addition to the first and second buses used mainly for arithmetic processing. By it, it is possible to input data from an external memory into the internal memory using the third bus at the same time arithmetic instructions are executed using the first and second buses during the one instruction cycle in parallel instruction.

BRIEF DESCRIPTION OF THE DRAWINGS

FIG. 1 is a block diagram of an audio/digital signal processing DSP according to one embodiment of the invention.

FIG. 2 is a field arrangement diagram of the instruction word in the DSP of the embodiment.

FIG. 3 shows the instruction cycle of a representative sum of products arithmetic instruction in the embodiment.

Figure 4:
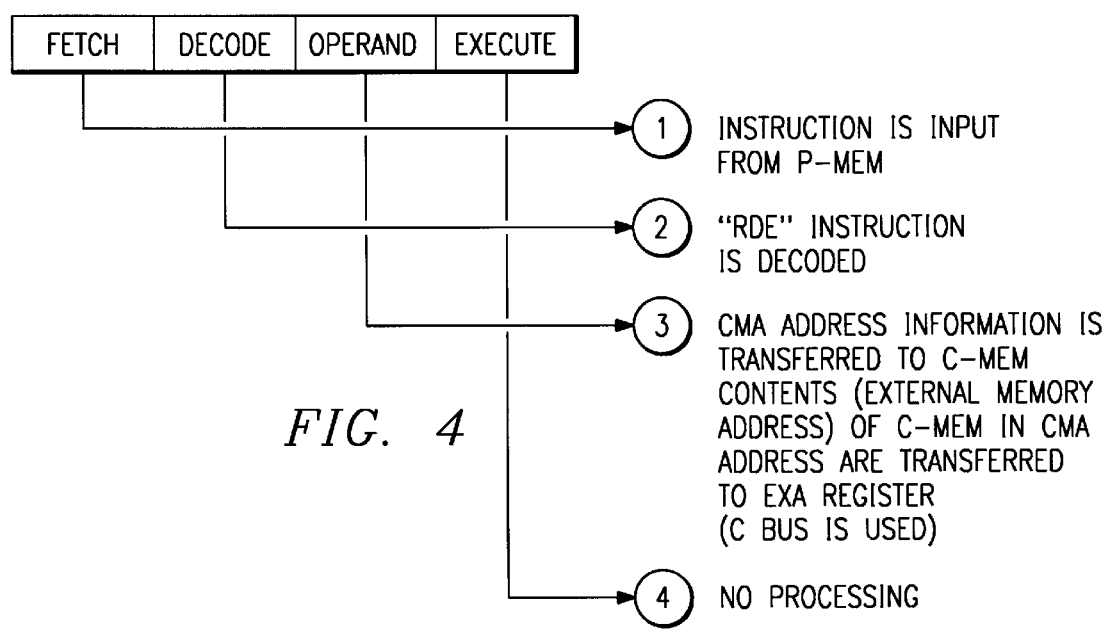
FIG. 4 shows the instruction cycle of the external memory readout instruction in the embodiment.

The figures also illustrate a C-BUS (data bus) 10, a D-BUS (data bus) 12, a G-BUS (data bus) 14, a C-MEM (coefficient memory) 16, a D-MEM (data memory) 18, a G-MEM (general-use memory) 20, addressing units 17, 19 & 21, an EX-I/O (external memory input/output interface circuit) 22, an AU-I/O (audio/interface circuit) 24, an ALU (arithmetic logic unit) 26, a MAC (sum of products computer) 28, a controller 30, a P-MEM (program memory) 32, and a HOST-I/O (host interface circuit) 34.

DETAILED DESCRIPTION

FIG. 1 shows the system structure of an audio/digital signal processing DSP according to one embodiment of the invention. This DSP system has three mutually independent data buses (C-BUS 10, D-BUS 12, G-BUS 14) and each part is connected to the buses as shown. A coefficient memory (C-MEM) 16, a general-use memory (G-RAM) 20, an arithmetic logic unit (ALU) 26, a sum of products computer (MAC) 28, a program memory (P-MEM) 32, and a host interface circuit (HOST-I/O) 34 are connected to a C-BUS 10.

A data memory (D-MEM) 18, a general-use memory (G-RAM) 20, an external memory input/output interface circuit (EX-I/O) 22, an audio/interface circuit (AU-I/O) 24, an arithmetic logic unit (ALU) 26, and a sum of products computer (MAC) 28 are connected to a D-BUS 12. A general-use memory (G-MEM) 20, an external memory input/output interface circuit (EX-I/O) 22 and an arithmetic logic unit (ALU) 26 are connected to a G-BUS 14.

The C-MEM 16, D-MEM 18 and G-MEM 20 can each be a RAM (random access memory). The C-MEM 16 mainly stores coefficient data for sum of products arithmetic, together with address information for accessing an external memory (not shown in the figures) connected to the EX-I/O 22. The D-MEM 18 stores data (mainly audio data) used for sum of products arithmetic and other arithmetic and data of the arithmetic results.

The general-use memory G-MEM 20 is normally used as an extension memory of data memory D-MEM 18. When handling a large volume of delay data, such as sound field reproduction, etc., delay data which does not fit into D-MEM 18 is stored in an external memory composed of a RAM and the delay data is input to G-MEM 20 from the external memory according to a prescribed instruction (BRDE instruction) to be discussed later when necessary. In this case, address information for accessing the external memory is also stored in G-MEM 20. G-MEM 20 can also be used as an extension memory of C-MEM 16 and there are times when coefficient data is stored according to necessity.

Addressing units 17, 19, and 21 for executing address computation are respectively attached to C-MEM 16, D-MEM 18, and G-MEM 20.

The external memory interface circuit EX-I/O 22 is also connected to the external memory for the delay data storage. It has a memory control function which can write or read data by accessing the external memory, and has a built-in data register, which holds the write or read data, and address register which holds the address information for memory access.

The audio/interface circuit AU-I/O 24 is for executing data exchange between the external digital/audio circuit and the DSP, and, for example, is connected to the CD playback circuit of the previous step, digital filter of the following step, D/A converter, etc. When audio signals (data) are input from an external circuit, an interrupt is applied to controller 32 (to be discussed later) when one piece of data is completed in the register within AU-I/O 24 and the data is stored in D-MEM 18 via D-BUS 12 by the interrupt process.

The ALU 26 is a computer for executing an optional arithmetic operation and logic operation and also has a built-in accumulator. MAC 28 is a computer for executing dedicated sum of products arithmetic and has a built-in accumulator and multiplier. The two computers (ALU 36 and MAC 28) are provided so parallel processing, such as executing convolution in MAC 28 while executing addition in ALU 26, is possible.

The program memory P-MEM 32, which can be a RAM, stores the program which specifies the processing operation of the DSP. Control circuit 30 successively reads the next instruction from P-MEM 32, controls the registers and gates (not shown in the figures) within the system by a PLA (program logic array) control system, and functions to make each part execute the pertinent instruction. In FIG. 1, control bus is not shown for convenience in the explanation.

Interface circuit HOST-I/O 34 is for exchanging data and programs between the DSP and a host controller (not shown in the figures), is connected to C-BUS 10 at the parallel port, and is connected to the host controller at the serial port. The program stored in P-MEM 32, address information and coefficient data stored in C-MEM 16, and address information stored in G-MEM 20 are provided by host controller and are downloaded to each memory from HOST-I/O 34 via C-BUS 10. There are cases when the address information is changed by the program within P-MEM 32.

In the DSP of the embodiment, three data buses (C-BUS 10, D-BUS 12, G-BUS 14) are provided as noted above and different address information or data can be transferred on the buses in parallel.

On C-BUS 10, in addition to programs, address information, and data downloaded to each memory from the host computer as noted above, address information provided to D-MEM 18 or EX-I/O 22 from C-MEM 16, coefficient data provided to MAC 28 or ALU 26 from C-MEM 16, etc., can be selectively transferred.

On D-BUS 12, input/output audio data exchanged between AU-I/O 24 and D-MEM 18, delay audio data exchanged between D-MEM 18 and EX-I/O 22, and arithmetic data exchanged between D-MEM 18 and ALU 26 or MAC 28 can be selectively transferred.

On G-BUS 14, delay audio data and address information exchanged between G-MEM 20 and EX-I/O 22, arithmetic data provided to ALU 26 from G-MEM 18, etc., can be transferred.

In this way, different address information or data can be transferred in parallel simultaneously on three data buses (C-BUS 10, D-BUS 12, G-BUS 14) so parallel processing of two instructions in one instruction cycle is possible as will be discussed later.

FIG. 2 is a field arrangement diagram of an instruction word in the DSP of the embodiment. FIG. 2(A) shows a generic format of the instruction word. For example, in one 32-bit instruction word, it is possible to specify two instructions (primary instruction, secondary instruction), a field of bits [29–22] is allotted to the operation code of the primary instruction and a field of bits [21–14] is allotted to the operation code of the secondary instruction. Bits [31,30] specify combined format (mode) of two instructions. Bits [13–0] are used for address specification of the operand.

It is possible to specify either the primary instruction or secondary instruction with one instruction word. The word arrangement when primary and secondary instructions are specified independently is shown respectively in FIGS. 2(B) and (C).

In the DSP of the embodiment, a background external memory readout instruction (BRDE) can be set for transferring data (delay audio data, etc.) from the external memory to G-MEM 20 using G-BUS 14. When a BRDE instruction is specified independently in one instruction word, it takes on the arrangement shown in FIG. 2(D) and the operation code of the BRDE instruction is input in the field of the secondary instruction. The address in the BRDE instruction is created in address arithmetic unit 21 of G-MEM 20 based on the stipulated address, so the operand is unnecessary and the addressing field becomes vacant. When a BRDE instruction in one instruction word is specified along with another instruction (primary instruction), it takes on the arrangement in which FIGS. 2(D) and (A) are combined and an addressing field is provided to the operand of the primary instruction.

Next, the operation of the instruction cycle of a number of instructions in the DSP of the embodiment will be explained. FIG. 3 shows the instruction cycle of "MACΔSS, D(xx), *C0, M0" which is one MAC instruction for executing a prescribed sum of products arithmetic processing using MAC 28. This instruction says to "multiply the contents of the memory address in C-MEM 16 specified by the contents (address information) of CO register (within addressing unit 17) and the contents of the memory address in D-MEM 18 specified with address (xx), add the multiplied result to the contents of MO register (within MAC 28), and store the added result in the MO register."

The operation when this instruction is executed is as follows. First of all, in the fetch cycle (Fetch), the memory read unit of controller 30 reads this instruction word from P-MEM 32 ({1}). Next, in the decode cycle (Decode), the decoder unit of controller 30 decodes this instruction ({2}). The microprogram control unit of controller 30 is operated based on the decoded result, the necessary registers and gates are made to function, and each necessary unit carries out the operand process (Operand) and execution process (Execution).

In the operand processing cycle (Operand), address information is fed respectively to C-MEM 16 and D-MEM 18 from controller 30 via addressing units 17 and 19. Then, the data read respectively from C-MEM 16 and D-MEM 18 is transmitted to MAC 28 via C-BUS 10 and D-BUS 12 ({3}). In the execution processing cycle (Execution), multiplication and addition are successively executed in MAC 28 and the final arithmetic result is stored in register (MO) ({4}).

In the DSP of the embodiment, each instruction cycle is shifted by just one phase between the instruction before and after to execute a series of instructions in the pipeline system. For example, when decode cycle (Decode) is being executed with respect to a given phase, the operaand processing cycle (Operand) of the previous instruction, execution processing cycle (Execution) of the instruction before the previous [instruction], and fetch cycle (Fetch) of the following instruction are executed simultaneous with the above.

FIG. 4 shows the instruction cycle of the external memory read instruction "RDE." This instruction says to "store the contents of the memory address within C-MEM 16 specified with address (cma) in address register EXA of EX-I/O 22 as the address for accessing the external memory."

In this RDE instruction cycle, after address information (cma) is provided to C-MEM 16 from controller 30 via address arithmetic unit 17, address information for external memory access reading from C-MEM 16 is provided to EX-I/O 22 via C-BUS 10.

When this RDE instruction is executed, EX-I/O 22 accesses the external memory based on the address information received from C-MEM 16, reads the contents in the memory address within the external memory specified with the address information, and stores the read data in read data register EXR. After the prescribed number of machine cycles after the execution of the RDE instruction using this type of memory access function in EX-I/O 22, the target data is prepared in data register EXR of EX-I/O 22.

Figure 5:
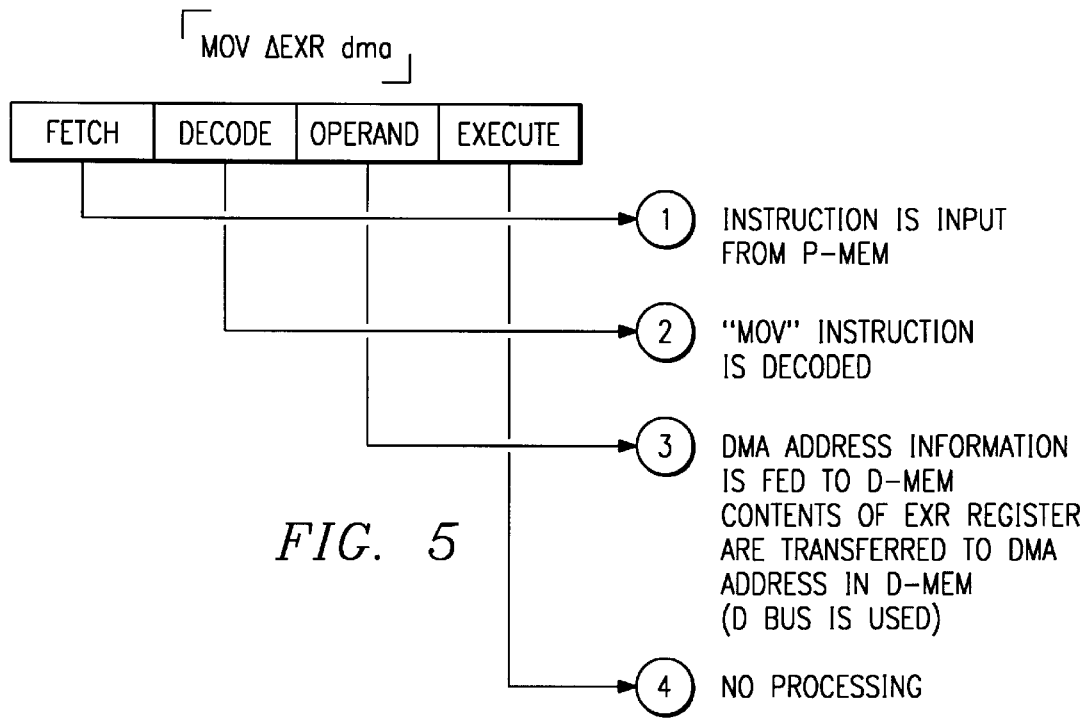
FIG. 5 shows the instruction cycle of the data transfer instruction related to the external memory readout instruction in the embodiment.

FIG. 5 shows the instruction cycle of a data transfer instruction "MOVΔEXR, dma" used in relation to the RDE instruction. This instruction is an instruction meaning "store the contents of data register EXR within EX-I/O 22 in the memory address within D-MEM 18 specified with address (dma). After a prescribed number of machine cycles after the execution of the RDE instruction, the target data is prepared in data register (EXR) of EX-I/O 22 as noted above, so by then executing this instruction "MOVΔEXR, dma" next, it is possible to input the target data in D-MEM 18.

In the DSP of the embodiment, the external memory write instruction "WRE" is also defined. Normally this instruction is stipulated as "WRE cma, dam." This means "write the contents (data) in the memory address within D-MEM 12 specified with address (dma) in the memory address of the external memory specified with the contents (address) of the memory address within C-MEM 10 specified with address (cma)."

Even when the WRE instruction is to be executed, each piece of data read based on the address information is transferred to write data register EXW and address register EXA within EX-I/O 22 via D-BUS 12 and C-BUS 10, respectively.

As noted above, the audio data from the CD playback circuit, etc., is input at each fixed time and is stored in D-MEM 18 with interrupt processing by AU-I/O 24. As input audio data is stored in D-MEM 18 in the FIFO format, delay data is output in the order, of oldest first. However, in digital signal processing which uses a large volume of delay data, such as sound field reproduction, reverberation, etc., there are times when delay data of up to a few seconds before it is used, so the delay data output from D-MEM 18 is stored in the external memory according to the WRE instruction. Then, when the delay data is needed in the filter arithmetic, it is read from the external memory according to the background external memory readout instruction (BRDE) to be discussed later.

Figure 6:
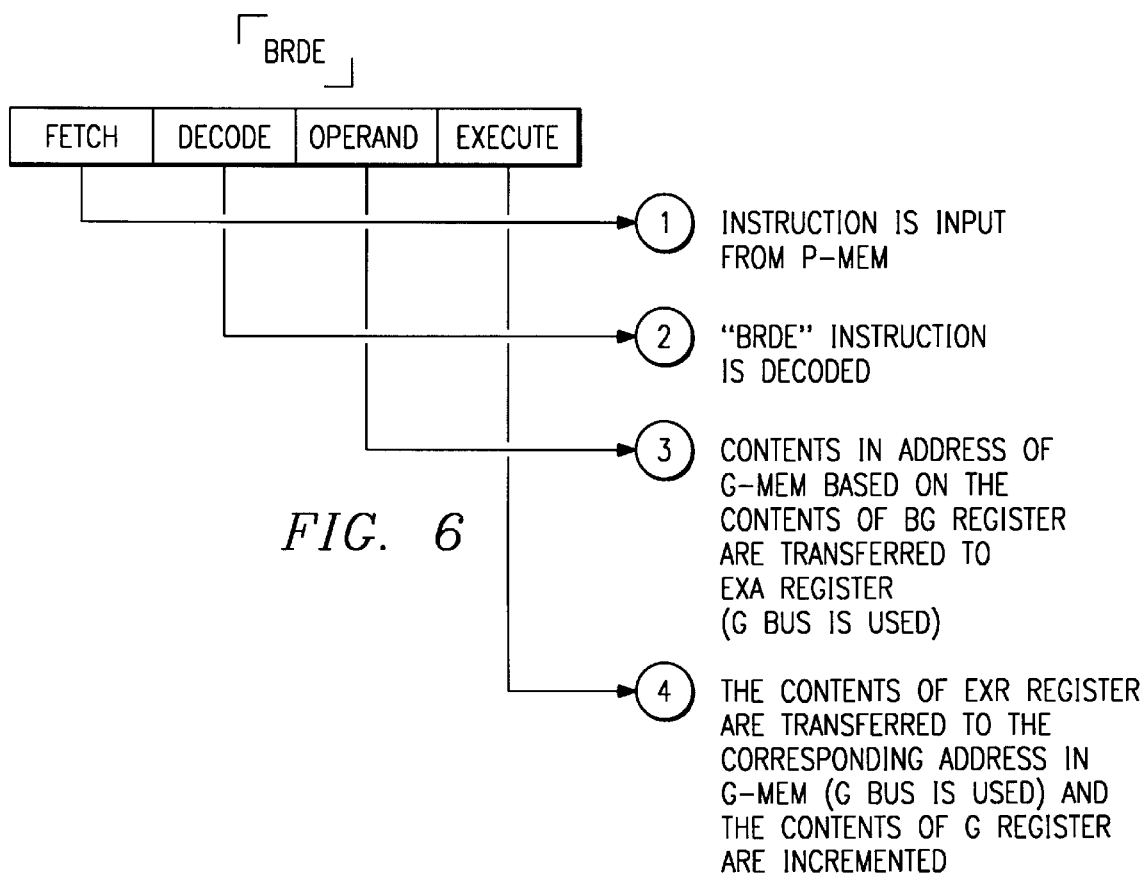
FIG. 6 shows the instruction cycle of background external memory readout instruction "BRDE" in the embodiment.

FIG. 6 shows the instruction cycle of background external memory readout instruction "BRDE" according to the embodiment. This BRDE instruction says to "transfer the contents in the memory address within G-MEM 20 specified with the contents of GB register (within addressing unit 21) to address register (EXA) within EX-I/O 22 as address information for external memory access, and store the contents of read data register (EXR) within EX-I/O 22 in the memory address within G-MEM 20 specified by the value which added 80H (10000000) to the contents of the GB register."

In this instruction cycle of the BRDE instruction, the address information for external memory access, which is the contents in memory address of G-MEM 20, based on the contents of GB register is transferred to EX-I/O 22 via G-BUS 14 during the operand processing cycle (Operand), and the data from EX-I/O 22 is transferred to G-MEM 20 via G-BUS 14 during the execution processing cycle (Execution) along with the contents of the GB register within addressing unit 21 being incremented by one.

The data transferred from read data register (EXR) within EX-I/O 22 with the BRDE instruction is the data read by EX-I/O 22 from the external memory by reacting to the previous BRDE instruction. Namely, it is data corresponding to the address information transferred to address register (EXA) within EX-I/O 22 from G-MEM 20 with the previous BRDE instruction. The data corresponding to the address information stored in address register (EXA) with the present BRDE instruction is held in read data register (EXR) by being read from the external memory at the prescribed machine cycle, and then it is transferred to G-MEM 20 by the next BRDE instruction.

The address (memory address) of the data stored in G-MEM 20 with the BRDE instruction can be obtained by adding 80H (10000000) to the contents (address information for external memory access) of the GB register, namely, by making the most significant bit 0 of the address information 1. Therefore, the address calculation is simple and the structure within addressing unit 21 is simplified.

In this way, in the BRDE instruction, transfer of data and address information is executed between EX-I/O 22 and G-MEM 20 using a dedicated G-MEM 20. Other buses (C-BUS 10, D-BUS 12) are not used and other memories (C-MEM 16, D-MEM 18) do not participate. Therefore, it is possible to process (execute) a parallel arithmetic instruction which uses C-BUS 10 and D-BUS 12 simultaneously with the BRDE instruction during one instruction cycle.

Data (delay audio data, etc.) input into G-MEM 20 from an external memory is read from G-MEM 20 at the point in time it becomes necessary in the filter arithmetic, etc., and is then transferred to MAC 28 or ALU 26. Instruction for this is also defined, but it is the same as the instruction for C-MEM 16 and D-MEM 18 via C-BUS 10 and D-BUS 12, so further explanation will be omitted.

Figure 7:
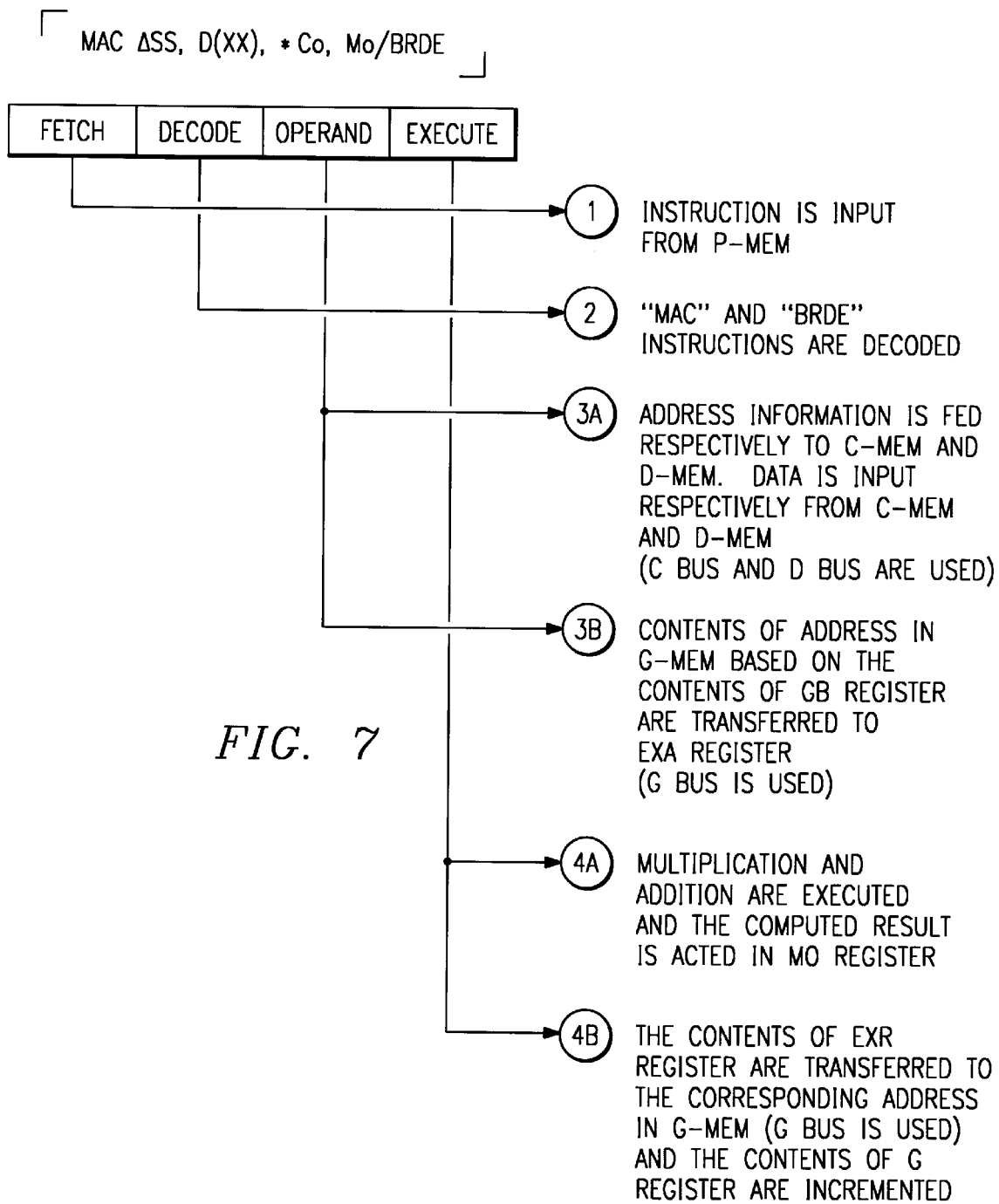
FIG. 7 shows the instruction cycle of a representative parallel processing type instruction which includes the BRDE instruction in the embodiment.
Figure 8:
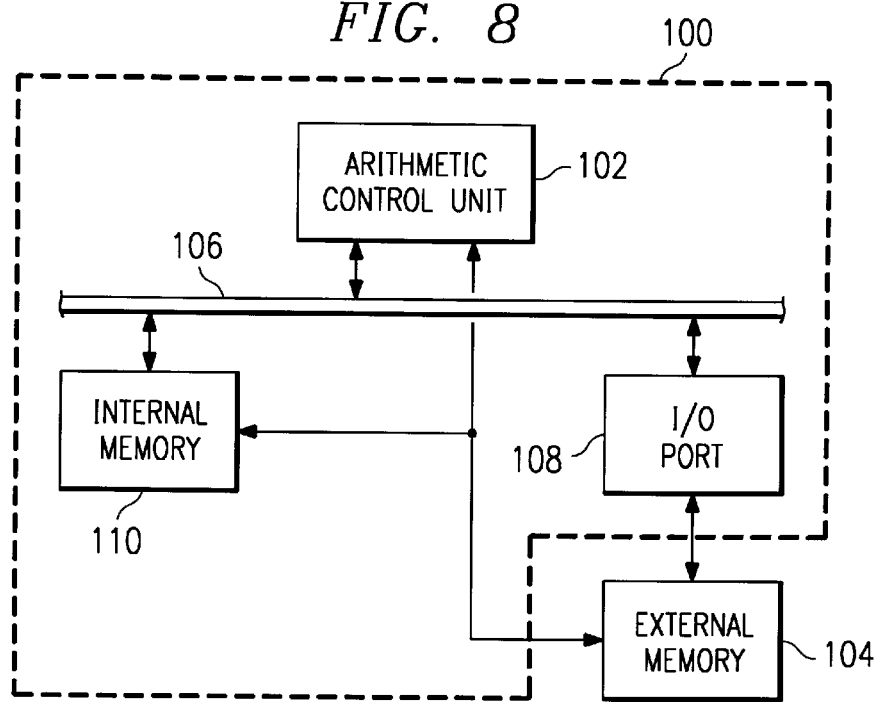
FIG. 8 is a block diagram of the main part of a conventional DSP system.
Figure 9:
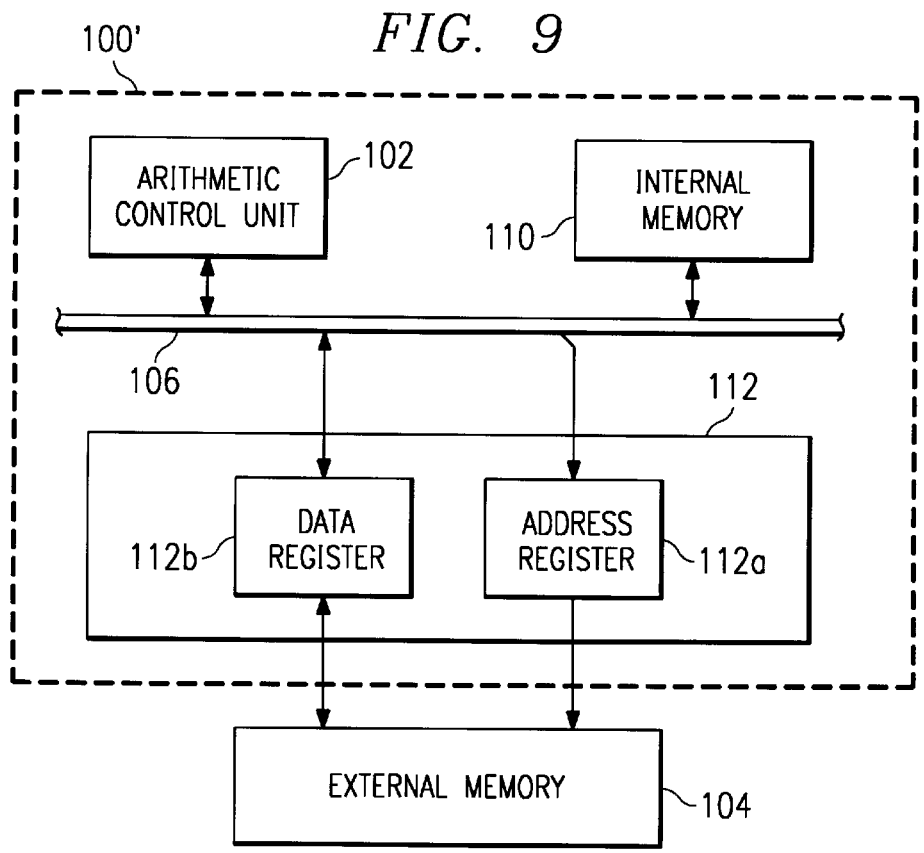
FIG. 9 is a block diagram of the main part of another conventional DSP system.

FIG. 7 shows the instruction cycle of "MACΔSS, D(xx), *CO, MO/BRDE," which is one parallel processing type instruction that includes a BRDE instruction. This parallel processing type instruction superimposes the BRDE instruction in FIG. 6 and the MAC instruction in FIG. 3 in parallel. The instruction word is the format in FIG. 2(A), the operation code of the MAC instruction is stipulated in the field of the primary instruction, and the operation code of the BRDE instruction is stipulated in the field of the secondary instruction.

The operation when this instruction is executed becomes as follows. First of all, the memory read unit of controller 30 reads the word of this parallel processing type instruction from P-MEM 32 at fetch cycle (Fetch) ({1}). Next, the decoder unit of controller 30 decodes the MAC instruction and the BRDE instruction included in the parallel processing type instruction in parallel or simultaneously in the decode cycle (Decode) ({2}).

In this case, the control signal from the PLA control part of controller 30 is output in parallel, namely, in the OR format in accordance with the MAC instruction and the BRDE instruction. By it, the address information for addressing units 17 and 19 are respectively fed to C-MEM 16 and D-MEM 18 in the operand processing cycle (operand), and simultaneously with the contents (data) of the target memory address being read respectively from C-MEM 16 and D-MEM 18 (operand processing of the MAC instruction), the address information of external memory access read from G-MEM 20 is transferred to EX-I/O 22 via G-BUS 14 (transfer processing of the BRDE instruction).

In the execution processing cycle (Execution), simultaneously with the sum of products arithmetic being executed (execution processing of the MAC instruction) in MAC 28, data from EX-I/O 22 is transferred to G-MEM 20 via G-BUS 14 along with the contents of the BG register being incremented by 1 within addressing unit 21 (execution processing of the BRDE instruction).

The sampling frequency of normal audio/digital signal processing is 44.1 kHz and a digital/audio signal is input from an external circuit, such as a CD, etc., at a time interval of about 22 $\mu$sec. The performance of the DSP is determined by how many sum of products arithmetic processes can be executed within this time (about 22 $\mu$sec). The number of instruction cycles which can be pipeline processed within this time (about 22 $\mu$sec) is set and is set to, for example, 512 steps so the performance of the DSP is determined by how many steps can be allotted in the arithmetic processing. On the other hand, when using a large volume of delay data in the filter arithmetic, such as sound field reproduction, etc., delay data stored in the external memory has to be read frequently.

In the DSP of the embodiment, it is possible to read the delay data from the external memory using G-BUS 14 and G-MEM 20 with the BRDE instruction, which is independent from arithmetic processing (specifically, sum of products arithmetic) instruction under the parallel type instruction system. Therefore, it is possible to allot many steps to the arithmetic processing while executing the BRDE instruction which reads the data from an external memory within the fixed time and can achieve sufficient processing capability in the DSP.

In the embodiment, general-use memory G-MEM 20 was provided separate from D-MEM 18, which stores the audio data, and C-MEM 16, which stores the coefficient data, and delay data is read in the G-MEM 20 from the external memory. However, it is possible to execute the BRDE instruction without providing G-MEM 20 by constituting C-MEM 16 and/or D-MEM 18 with a dual port type memory having two ports and connecting to G-BUS 14.

Also the DSP of the embodiment pertains to audio/digital processing, but the DSP according to the invention can be applied to any digital signal processing.

In the embodiment, an explanation was given in accordance with the storing of audio data in the external memory, but in addition to audio data, different data, such as coefficient data, etc., may be stored in the external memory.

As explained above, according to the digital signal processor of the invention, simultaneously with the executing of an arithmetic instruction using the first and second buses in one prescribed instruction cycle, data from an external memory was input into the internal memory using the third bus making it possible to improve the processing capability by increasing the arithmetic processing frequency per unit time along with securing enhanced speed in the pipeline process.

We claim:

1. A digital signal processor for processing digital signals by executing a series of instructions in a pipeline system, comprising:

first, second, and third buses for simultaneously transferring data on each bus;

first and second internal memories respectively coupled to the first and second buses;

a third internal memory coupled to the third bus and at least one of the first and second buses, an arithmetic circuit coupled to the first and second buses, an input/output interface coupled to the third bus and at least one of the first and second buses for reading and writing data to an external memory, wherein a single instruction includes a primary instruction for operation on data on said first and second buses and a secondary instruction for transferring data on said third bus in a single instruction cycle.

2. The digital signal processor of claim 1 wherein data read from the first and second internal memories is operated on by the arithmetic circuit via the first and second buses for arithmetic processing;

prescribed address information is transferred to the input/output interface via the third bus; and data read beforehand by the input/output interface from the external memory is transferred to the third internal memory via the third bus in accordance with the second instruction.

3. The digital signal processor of claim 2 wherein the third internal memory comprises a first memory area for storing address information for accessing the external memory and a second memory area for storing the data transferred from the external memory; and and wherein the address of each of the data stored in the second memory area can be calculated by adding a fixed constant to the corresponding address in the first memory area.

4. A digital signal processor for processing digital signals by executing a series of instructions in a pipeline system, comprising:

first, second, and third buses capable of simultaneously transferring different data;

first and second data storage devices coupled to (i) the first and second buses, at least one of which is a dual port type, and (ii) the third bus; and an arithmetic circuit coupled to the first and second buses;

an input/output interface coupled to the third bus and at least one of the first and second buses which can write and read data in an external data storage device;

wherein a single instruction includes a primary instruction for operation on data on said first and second buses and a secondary instruction for transferring data on said third bus in a single instruction cycle.

* * * * *